United States Patent [19]
Figart

[11] Patent Number: 6,164,971
[45] Date of Patent: Dec. 26, 2000

[54] HISTORICAL EVENT REENACTMENT COMPUTER SYSTEMS AND METHODS PERMITTING INTERACTIVE ROLE PLAYERS TO MODIFY THE HISTORY OUTCOME

[76] Inventor: Grayden T. Figart, 208 N. Randolph Rd., Fredericksburg, Va. 22405

[21] Appl. No.: 08/508,540

[22] Filed: Jul. 28, 1995

[51] Int. Cl.[7] .................................................. G09B 19/00
[52] U.S. Cl. ...................... 434/154; 434/118; 434/307 R; 434/365
[58] Field of Search ...................... 434/118, 307 R–309, 434/322–324, 362, 365, 130, 150, 154, 236, 319, 429; 472/57, 59; 40/1, 427; 463/2, 9, 23, 24, 42; 273/138.1; 364/410.411; 395/152, 154; 371/19; 345/145, 146, 161, 163, 167

[56] References Cited

U.S. PATENT DOCUMENTS

| | | | |
|---|---|---|---|
| 4,342,454 | 8/1982 | Baer et al. | 463/31 |
| 4,722,526 | 2/1988 | Tovar et al. | 463/9 |
| 4,841,291 | 6/1989 | Swix et al. | 434/307 R X |
| 4,976,438 | 12/1990 | Tashiro et al. | 463/2 X |
| 5,065,345 | 11/1991 | Knowles et al. | 434/308 X |
| 5,240,419 | 8/1993 | deGyarfas | 434/118 X |
| 5,261,820 | 11/1993 | Slye et al. | 434/118 X |
| 5,267,865 | 12/1993 | Lee et al. . | |
| 5,306,154 | 4/1994 | Ujita et al. | 434/218 |
| 5,558,339 | 9/1996 | Perlman | 463/23 X |

*Primary Examiner*—Joe H. Cheng
*Attorney, Agent, or Firm*—Breiner & Breiner

[57] ABSTRACT

This invention relates to methods and systems for reenacting historical scenarios in a computer controlled data base and operating system wherein roles are segregated and processed to permit intervention of interactive role players for modifying the reenacted scenarios in accordance with their reactions and decisions on line as they view the scenarios. In this way, the role players get involved personally in the historical events reenacted to make the action and results more memorable, interesting and understandable. Different roles may be chosen to match the skills, capabilities and interest of the role players. The role players input decisions are substituted in the reenactment to conform with or change the course of history and feedback is provided to inform the role player of the impact introduced. Thus, grading or evaluation records for role players may be produced. The system may be simplistic enough for a single role player at a personal computer to order down a historical scene, select a roll and view the reenactment while participating in the selected role. Alternatively, the system may involve teams of players, such as classes, competition between players and interaction of several players in more complex systems. The role players may be at a single site such as a theme park or arcade, or may be networked from a set of different sites.

16 Claims, 4 Drawing Sheets

HISTORICAL EVENT REENACTMENT COMPUTER SYSTEMS AND METHODS PERMITTING INTERACTIVE ROLE PLAYERS TO MODIFY THE HISTORY OUTCOME

TECHNICAL FIELD

This invention relates to interactive computer systems and more particularly it relates to reenactment of historical events for interactive participation of viewers as role players.

BACKGROUND ART

Interactive computerized educational systems are known which provide lectures and corresponding evaluation of the students' retention of the subject matter, such as for example, U.S. Pat. No. 5,267,865, issued Dec. 7, 1993 to J. R. Lee for Interactive Computer Aided Natural Learning Method and Apparatus.

However a significant deficiency exists in the prior art computerized educational process, which is done at large without explicit teacher feedback. Thus, individual students need motivation to incite interest and need to understand the impact of history. For example, history could be dull for many students if given historical lectures in the form of stories crammed with dates, names and critical circumstances. It is not surprising then that motivation of students to study such materials to remember the dates, names and events may not be high. Furthermore, the prior art does not induce students to recognize the significance of historical events or to understand what factors and influences contributed to the outcome.

It is therefore an objective of this invention to present historical events under control of a computer system in a format that will keep students interested in history.

Furthermore it is an objective to motivate history students in a manner that they more easily understand and remember the important dates, persons and critical circumstances related to the events.

DESCRIPTION OF THE INVENTION

This invention therefore incites the interest of the students in the historical events by involving them personally in an interactive role playing part that will have the potential to change history depending upon the choices the student makes on-line in the presentation of the event. Key roles may be chosen in a contest emphasizing the timing, environment and risks involved. This not only keeps the student's interest but makes the circumstances memorable enough that the important dates, persons and circumstances are grasped and understood with less tedious study. Furthermore the evaluation and understanding of critical circumstances in the event is encouraged by role participation which affects a change in the historical outcome. In addition, a feedback report "grades" and evaluates the role player, explaining what result the participation precipitated and its relationship with the authentic historical outcome.

The role playing mode of presentation and the associated method of historical event interactive participation thus creates a novel environment where the student is induced by personal interest to more satisfactorily think about the event as it happened and to understand better the critical circumstances that made an impact on history.

The computerized system for implementing historical events in this mode of presentation can have different complexities and participation sites, varying from a simplified personal computer embodiment to a wide area network of participants, and even may be a complex self contained theme park embodiment for selected historical events, such as for example: The Battle of The Alamo.

Other features, objectives and goals of the invention will be found throughout the following description, drawings and appended claims.

BRIEF DESCRIPTION OF THE DRAWINGS

In the accompanying drawings, in which like reference characters throughout the various views refer to similar features to facilitate comparison.

THE PREFERRED EMBODIMENTS

Figure 1:
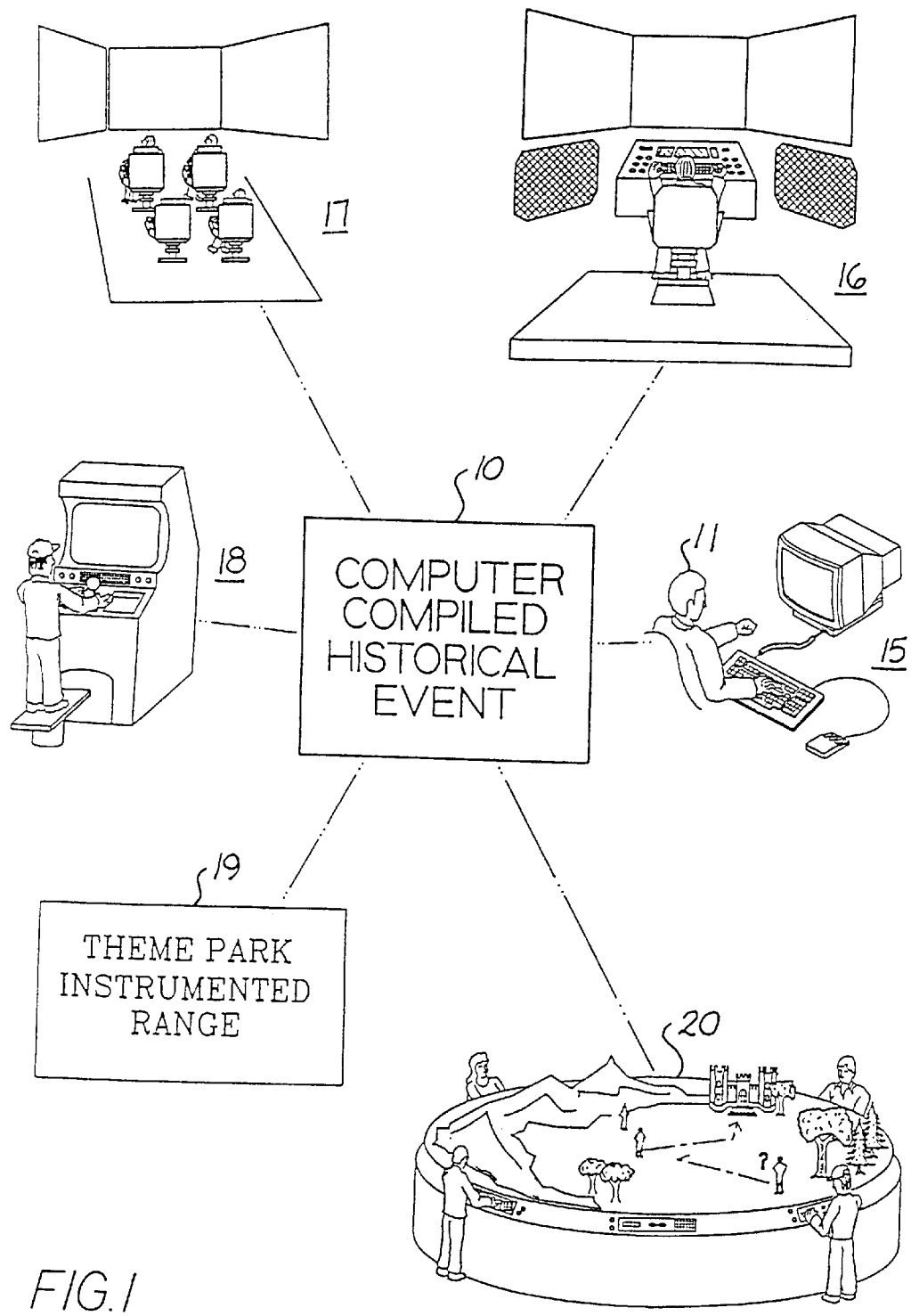
FIG. 1 is a diagrammatic view of a diversified wide area network of interactive installations interconnected for computer controlled reenactment of a historical event to permit on-line interactive role playing intervention, as afforded by this invention.

FIG. 1 generally portrays the diversity of the role-playing, historical-reenactment computerized system afforded by this invention for involving students into history by role playing of critical roles that hypothetically affects the outcome of a historical event reenactment. This system incites great student interest in the event and impacts indelibly upon the students memory the time, the persons and the impact of the event and critical incidents within the event by personal involvement requiring reasoned decisions.

The computer system for compiling, monitoring and directing the historical event, designated by the reference character 10, may be centrally located for a wide area network with role players in different sites or may be incorporated at least in part in the local role playing stations 15–20 for local area interactivity involving one or more role players. The dotted interconnection lines thus indicate the optional role intervention of one or more of the student interface stations 15–20 into the presentation and development of a reenacted historical event.

In the simplest embodiment, the personal computer station 15, is self contained incorporating the data bases, computer control system and programming for the intervention of the single role player 11 into an available historical event reenactment. Alternatively that player 11 may be connected, such as by modem, to a central computer for interaction into the event with the opportunity to act in concert with other role players located at different geographical sites.

More sophisticated theatre type presentations may be produced either for individual participation 16 or for team participation 17 in a classroom, for example. In the latter respect several classes may be interconnected for playing different roles, or for competing to determine which class more accurately relates to the actual historical event, thus testing class comprehension of a history course, for example. Arcade stations 18 may be provided for individual operation or systemized to produce competitive roles for more than one player. The system also is ideal for simpler types of site presentation systems 20 in which several role players interact with visual feedback of the action from a staged arena. The more complex system of the type found in theme parks is illustrated at 19, in block format.

Now some general background and operation features of this computer controlled interactive historical reenactment system are reviewed in perspective before discussing the details of system implementation and exemplary historical events. The primary purpose and objective of this invention is to get individuals involved personally into historic events, thus giving them greater interest in and a better understanding and recall of the event including some of the more critical incidents involved in a particular historic scenario. This is achieved by letting viewers interactively participate in a role of their choice that will have a bearing upon the historical outcome depending upon the personal decisions made by the role player when faced with the circumstances relating to the critical events. The actual historical event is as authentically reenacted as feasible and carefully distinguished by reporting the effect of the role player on the outcome and comparing it to the actual events that occurred, thereby emphasizing the importance of the historical event.

To achieve this objective the reenacted event is broken down in various scenes where key historical role players have made an impact upon history by their actions, decisions and timing. These scenes are then implemented in a typical embodiment for interactive computer branching at an on-line point in the sequence of the actual historical event to substitute a hypothetical event incorporating the role player's performance. This is achieved with a hypothetical synthesization of the outcome which could be presented either on line or in a post-mortem feedback evaluation report. The event can be limited to give the role player choices within a set of predetermined options at critical times in the scenario, each related to a different hypothetical end result in the historical event. Then with feedback, such as computer printout after the reenactment, or a presentation of both the authentic historical result and a hypothetical result reflecting the role player reactions for comparison, the player is informed of the impact of personal decisions in a way that reinforces the memory and significance of the actual historical event.

With this background it is readily recognized that the invention may be implemented with state of the art computer systems in various scopes of complexity and with accompanying "trade dress" depending upon the forum of presentation. For example a role player with a joy stick may fly an airplane toward a bombing site at a critical time, or a player wearing a red coat at an arcade site may emphasize a role as a British General in a competitive duel with George Washington wearing a tricorner hat.

Typical simplified examples from a diverse array of historic events are reenactable with this invention to permit interactive roles affecting the event outcome to be personally reviewed reinforcing the understanding and later recollection of the authentic historical scene. Such scenes are automatically developed in its real time sequence in a computerized system to implement the nature and spirit of this invention which incorporates various embellishments to realistically portray historical facts and critical scenes with historical impact for presentation to various audiences at one or more reenactment sites.

Examples of the interactivity roles in historic event reenactments are illustrated by the following simplified examples.

EXAMPLE A[1]

[1] This example illustrates the optional interactive reenactment embodiment implemented branching of the on-line reenactment at a selected time for intervention in a manner having the capability to modify the end result in response to role player decisions.

Scenario: War of 1812—British Invasion of Washington
Role Player: Dolly Madison
Critical Interactive Scene:

The first lady, Dolly Madison, is in White House in 1812 awaiting arrival of a courier reporting the current status of the British Army march upon Washington. The courier reports that only scouting skirmishes are delaying the British advance toward Washington, that reserves are needed elsewhere and that it will be inevitable that Washington will fall to the British within 24 hours. Dolly must now decide what to do. An interactive menu presented to the role player Dolly outlines four choices:

a. To persuade her husband to convoy her escape out of Washington with a troop escort, b. To rally the troops in the area with her leadership to put up a last ditch fight when the British arrive, c. To pack up some valuables and get out while the getting is good, d. To confront the British Army General personally and plead for preservation of the capital city.

Branched Endings of the Scene for these Choices:

a. The troops for conveying Dolly were withdrawn from those skirmishing with the British. Because of that the British march to the Capital was unimpeded and arrived in time to send some troops after Dolly to take her prisoner. The British General demands surrender in order to release the valuable hostage, Dolly.

b. By marshalling troops about the White House to protect Dolly and treasures there, the British confront and overwhelm a key Cavalry Unit that could not escape to fight another day. Consequentially the British won a decisive battle carrying them to early victory, and Dolly is killed in the battle for occupation of the White House.

c. Dolly becomes a heroine by waiting until the last moment to leave, giving her time to pack the wagons with the most important national treasures, and moves out at the last moment to escape the British Army while they stopped to watch Washington burn.

d. The British General takes Dolly as a hostage, demanding surrender of Washington to the British without battle in order to preserve her life.

Feedback to Dolly Role Player after the Hypothetical Ending:

Rerun of actual scenario end portion with the authentic ending (c.). This done simply by backup and printed out analysis of Dolly's reasoning could be produced for comparison and emphasis of the critical scene, as follows:

a. Dolly reasoned that the British Army was so formidable and outnumbered defenders enough that the chance of reversal of the march on Washington would be small.

b. Dolly considered that defensive troops could be sacrificed trying to protect her and would be critical for fighting other battles to save them from the British.

c. Dolly thought that there were some national treasures that should not fall to the enemy and she should spend as much time as possible preparing to leave with as many of those treasures as could be saved ahead of the invading forces. She reasoned that the British army would not pass through Washington quickly but rather that their objective was to capture and occupy the city. Thus she could expect to save herself and staff without involving protective troops for covering her retreat when they would be so essential for other battles and skirmishes that might eventually lead to victory.

d. After the sacrifice of the Revolutionary War heroes for obtaining freedom from Britain, no American could ever make a deal with the enemy. The wife of the President could not trust the British or consider preempting American defense tactics planned by the army to combat the British army.

Implementation of the Historical-Event:

This simplified illustration requires only one intervention at a branching point in the presentation of the historical scene where the single role player Dolly makes a simple menu choice that would be critical in effecting the outcome of history.

Thus the scene would branch to a data source for retrieving the corresponding hypothetical endings for the three wrong choices for completion of the scene.

A following tutorial presentation respectively keyed to the interactive menu choice then is retrieved for "Monday morning quarterbacking". This critical feedback with the involvement of the role player has involved the student personally to emphasize the historical lessons and indelibly write on the personal memory the important events found in the historical scene and the impact on American history.

EXAMPLE B

A more complicated event with the interactive involvement of multiple role players is illustrated by the following Example.

Scenario: Adoption of the Declaration of Independence in the Second Continental Congress meeting at Carpenter's Hall, Philadelphia in July 1776 debating Virginia's proposal for Independence.

Role Player Choices:

Representative role players could be: (a) John Hancock, President of the Congress; (b) a teenage courier for George Washington reporting on the fight for New York, which could isolate New England; (c) a team of delegates in session in New York, and (d) Edward Rutledge, Delegate from South Carolina. Other delegates and historical personalities such as British General Howe could also be made available in corresponding roles for emphasis of colonial environmental conditions and risks.

Critical Interactive Scene Background Summary:

(John Hancock) While in favor of Independence, as Chairman can take no sides. He has ruled that the vote must be unanimous to avoid squabbling between the states, as has been fatal in European history.

Taking a caucus he finds the following:

Strongly in favor: Virginia, New Hampshire, Massachusetts, Rhode Island, New Jersey, Connecticut.

Against: Pennsylvania and (because of the slavery issue) North and South Carolina and Georgia.

Divided: Maryland, Delaware.

No Instructions-abstaining pending word from the courier: New York.

Interactive System Reenactment Sequence:

Depending upon the number of role players, and their decisions in chosen critical scenes, the system will create a scene that permits the role players to affect the outcome in the general manner of the aforesaid Example A, and to be reinforced with a report that may constitute a reenactment rerun of authentic historical roles or a computer printout comparing and emphasizing the lessons of history with a personal relationship to the role player's activity.

Thus, the teen-age courier must make sure that dispatches from General Washington, who is fighting the British in New York City, reach Congress. The Tories and Redcoats must be avoided on a simulated horseback ride, avoiding patrolled bridges and meeting with challenges along the way. Time of delivery is critical and the courier arrives breathlessly at some point in the debate on independence with the message that George Washington was defeated in Manhattan for relay to the Chairman of the delegates.

The team of delegates in New York must decide quickly what instructions to give their delegate to the Continental Congress in Philadelphia regarding the proposal for Independence while the British are fighting nearby and defeating General Washington's meager army. They could be inclined that Independence would be very sweet in lieu of the potential defeat by the British if all the Colonies combine their resources to fight for that independence. Conversely, they could look upon the hopelessness of the Colonists' cause and the formidable British army. In any event, they must consider that they might not have later rapport with the twelve remaining colonies if only they voted against independence.

Rutledge, 26 years old, a southern plantation planter with slaves, being an acknowledged leader of the North Carolina and Georgia delegates, is violently opposed to the slavery clause in the declaration but is inclined to vote for independence for the sake of unanimity of the Colonies provided the slave clause is removed from the declaration. John Hancock is requested to process a motion for removal of that clause.

Appropriate menus including corresponding individual scenarios describing the criticality of the role and individual circumstances not evident from the running scene may be presented to these role players at pauses in the real time reenactment of the scenario. The computerized system is programmed to adopt the role player decisions, merging them into the development of the scene and to reach its corresponding conclusion.

Similarly each of the role players will receive both an individual and team evaluation report at the conclusion of the "hypothetical" scenes, and given an opportunity to review authentic historical facts and role decisions leading up to the unanimous declaration of the thirteen Colonies such as by rerun of the authentic historic scenario.

As may be seen by reference to FIG. 1, the roles can take place in separate environmental circumstances at different sites, even involving a central stage illustrated at 20 where parts of the reenactment could be animated. An individual role player, such as the courier could be located at a PC station 15, whereas the New York delegates could be meeting in the assembly hall 17 for a team vote on their role playing decisions. Alternatively, the entire scenario could be implemented at the theme part 19 for audience participation in single and group roles at corresponding interactivity stations.

Clearly this invention uniquely presents to interactive participants authentic historical events, gets them involved for more intensive personal interest, and makes the events unforgettable because in effect the participants are there in person contributing to history. Most important, the understanding of the historical events and the critical nature of timing, personalities, dates, sequences and outcome are vividly impressed upon the individual participant's memories.

Key steps in the historical presentations afforded by this invention include the reenactment of a historical event under supervision of a computer system for viewing and participation of active roles which are segregated for interactivity. Critical roles are selected in on-line sequence that can affect the-historical outcome of the event. Thus, hypothetical scenes are produced with selectable role feedback for substitution in a manner changing the course of history. This emphasizes and implants indelibly on the participants' memory the nature of critical events, the roles and impact of the event upon history. Personal feedback relating to the participant's interactivity introduces a better understanding of the event, the key participants and the critical environmental-conditions that interact in the outcome.

The scenario reenactments may be embodied in simpler state of the art electronic communication systems such as personal computers (PC) or more complex type of multimedia systems which provide the opportunity to modify and control scenario action and accompanying stage effects with player introduced reactions including those such as commonly available at game arcades. The overall network system can process mixtures of player control embodiments of different characteristics into live on-line action and feedback synthesized hypothetical results in a manner teaching the consequences of history and the roles and facts actually involved.

Figure 2:
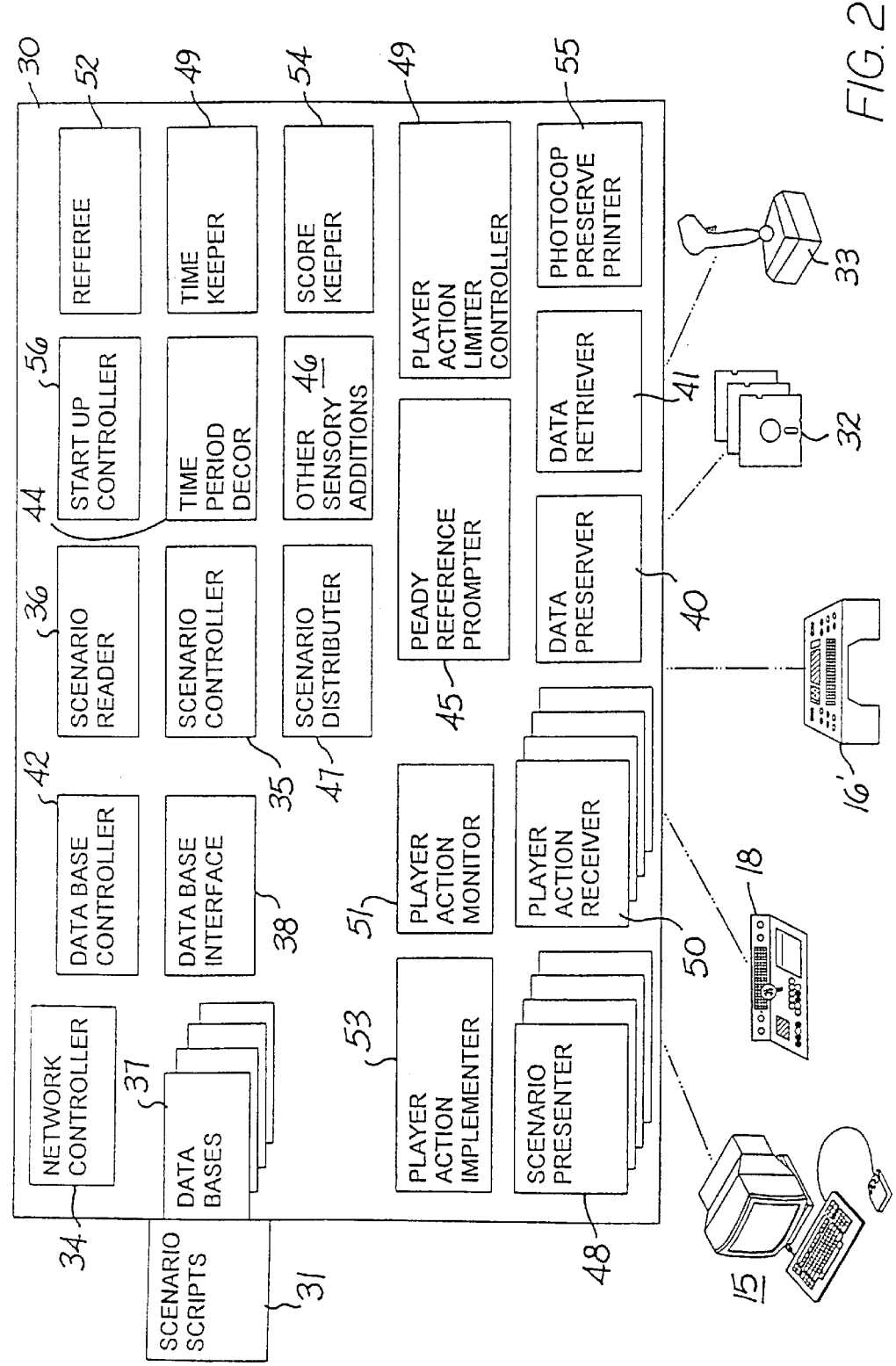
FIG. 2 is a block system diagram of the computer network system embodiment of the invention with diagrammatic representations of related interconnected computer functions and accessories.

In FIG. 2, the implementation of the computerized supervision of the historical events with interactive participation of invited role players is illustrated by a function block system diagram and an array of interface instruments. Connection lines between the functional blocks are omitted to avoid confusion in lieu of clarification of the understanding of the various interactions in the following text by descriptive passages.

Thus, the computer system 30, which receives appropriate historical reenactment scenario scripts 31, processes the interactive choices of role players at such input instruments as the PC 15, arcade terminals 16', 18', or the joystick 33. Associated software discs 32 may be required or desired for establishing player-action interfaces or license to intervene in a particular role in a designated script. For example, these discs 32 could provide, in preparation for intervention, software practice rounds that acquaint the role player off-line with the event and role background, and permit development of skills, particularly for example, if such skills involved reacting to the controls of an aircraft involved in the reenactment, etc.

THE COMPUTERIZED CONTROL SYSTEM 30

This control system constitutes in essence a computerized reenactment system for presenting scenarios of historical events. The system provides for interactive participation by role players in the development of on-line scenes. The various blocks each relate to functional subsystems involving state of the art computer technology with accompanying programming for performing a set of functions exemplified by the embodiment which follows. There are various optional degrees of flexibility and choice for the basic system requirements and role player interfaces that may depart from this embodiment but not from the spirit or nature of the invention, all of which can be arranged and interconnected at the option of those skilled in the art and the system proprietor.

The Network Controller 34 serves the function of interrelating and supervising various input devices at one or more sites, some of which may be connected by modem, or the like. Typical software provides for the following kinds of control functions:

(1) To send identified data sets to participants connected into the network;

(2) To receive participation data sets from the network participants; and (3) To interface with the scenario controller 35 for timing and effect upon the reenactment of the scenario.

The Scenario Controller 35 functions in the following manner:

(1) Provides supervisory control over the entire scenario session;

(2) Synchronizes the sequences and timing;

(3) Controls the Scenario Reader 36;

(4) Coordinates data from Data Bases 37 through the Data Base Interface 38 for the scenario and tutorial feedback functions to the role players;

(5) Implements actions induced by data retrieved from the data bases 37;

(6) Coordinates actions with the Scenario Distributor 47; and (7) Records retained scenario actions, such as role player feedback excerpts and background information in the Data Preserver memory bank 40.

The Data Base Interface 38 serves to:

(1) Control transfer of master data from bases 37 into an internal transient session data base bank;

(2) Controls session data file interfacing with the transient session data base bank;

(3) Maintains and supervises all data ID markers in current use for distribution to corresponding data bases;

(4) Routes selected data to the system modules upon request;

(5) Associates dependent data with primary data being processed; and (6) Protects all data in the Master Data Bases from corruption.

The Scenario Reader 36 serves to:

(1) Accept continued reading commands from the Scenario Controller 35;

(2) Reads next sequential action from the Data Base files;

(3) Incorporates all appropriate auxiliary data;

(4) Monitors the timing of each data base entry; and (5) Provides data base entries and entry timing to the Scenario Controller 35.

The Data Preserver 40 serves to:

(1) Collect action data from the script and role players;

(2) Separate permanent action data for recording;

(3) Saves associated data segments; and (4) Distributes saved data to appropriate media.

The Data Retriever 41 serves to:

(1) Select script from the media;

(2) Read in recorded actions as scenario data base for the current session;

(3) Read in all associated data for the session;

(4) Distinguish unapproved previously recorded data; and (5) Monitor content of the current data base.

The Data Base Controller 42 serves to:

(1) Set up all data base pointers;

(2) Sequence the pointers through the data bases;

(3) Maintain-control over sequential selection of next item;

(4) Direct pointers to alternate actions selected by players;

(5) Set pointers to insert actions selected by players; and (6) Select proper data from data bases.

The Time Keeper 43 serves to:

(1) Record start time for session;

(2) Record Player start time in session;

(3) Record Player action times;

(4) Monitor and supervise player action times;

(5) Monitor and supervise session times;

(6) Produce running out of time warnings;

(7) Monitor idle system times during session; and (8) Assure conformance to real time session schedules.

The Time Period Decor Block 44 serves to identify the time period decor in each session for identification and control of errors in player inserts for such items as: furniture, buildings, food, costumes, accessories, tools, weather conditions, etc.

The Ready Reference Prompter 45 serves to:
(1) Process player requests for help;
(2) Monitor player station circumstances;
(3) Process informational messages;
(4) Edit and amplify player information; and
(5) Transmit player information to the scenario.

The Other Sensory Additions Block 46 serves to:
(1) Receive sensory indications from the Scenario Distributer;
(2) Introduce other appropriate sensory indications; and
(3) Send the Sensory data to the Scenario Presenters.

The Scenario Distributer 47 serves to:
(1) Accept qualified actions for implementation;
(2) Insert time period decor;
(3) Insert Other Sensory Additions from 46;
(4) Transmit session action to all on line participants; and
(5) Transmit session action to the Network Controller 34.

The Scenario Presenter 48 serve to:
(1) Accept implemented Scenario actions for presentation to the players;
(2) Accept the Time Period Decor Block 44 inputs;
(3) Integrate the time period decor into display data sets;
(4) Accept and include other sensory addition inputs and data;
(5) Include player action message responses;
(6) Incorporate timing and feedback or scoring information;
(7) Interpret and implement action for local player station facilities; and
(8) Transmit translated action data to the player stations.

The Player Action Limiter Controller 49 serves to:
(1) Accept player action assistance requests;
(2) Process player action limit restrictions;
(3) Integrate player actions within system restrictions; and
(4) Advise players of current action limitations.

The Player Action Receiver 50 serves to:
(1) Monitor all players actions;
(2) Edit and synthesize player station inputs;
(3) Accumulate player input records and statistics; and
(4) Process and forward player requests to player stations.

The Player Action Monitor 51 serves to:
(1) Receive player actions;
(2) Coordinate player action with Limiter Controller 49;
(3) Coordinate player action with the Referee 52;
(4) Flag unacceptable player actions;
(5) Introduce applicable amplifying data;
(6) Implement acceptable player actions; and
(7) Report statistics on player synthesized actions.

The Referee 52 serves to:
(1) Examine Scenario feasibility criteria;
(2) Feed back to player stations activity criteria limitations;
(3) Establish corrective action when feasible; and
(4) Disconnect players when corrections are not achievable.

The Player Action Implementer 53 serves to:
(1) Receive approved player actions;
(2) Schedule insertions into the session data base;
(3) Establish and schedule ancillary supplemental actions; and
(4) Provide approved player prompts when required.

The Score Keeper 54 in general monitors players actions and keeps score for producing evaluation feedback scores or summary reports on consequences, with typical steps including:

(1) Monitoring player decisiveness;
(2) Monitoring player knowledge of the Scenario;
(3) Determining errors in action;
(4) Developing and preserving composite evaluation; and
(5) Preparing and presenting player score, grade or feedback report.

The Photocopy Preserver Printer 55 serves to:
(1) Process implicit or direct player requests for copy;
(2) Save data to preserve scenes;
(3) Incorporate data into composite scenes;
(4) Transmit printable data to memory data file;
(5) Display scenes to customers upon request; and
(6) Printout on a printer when time is available.

The Start Up Controller 56 serves to:
(1) Process players for entry;
(2) Check player's authorization to participate;
(3) Assure permission to share information with others;
(4) Process players Scenario selection;
(5) Display role selection menu available;
(6) Give player background information;
(7) Establish a difficulty level of participation;
(8) Customize participation to player's needs and ability;
(9) Schedule and present the desired Scenario; and
(10) Initiate the player's role in the Scenario.

FIG. 3 FLOW AND SEQUENCING OF DATA FOR INTERACTIVE SCENARIO 60

Figure 3:
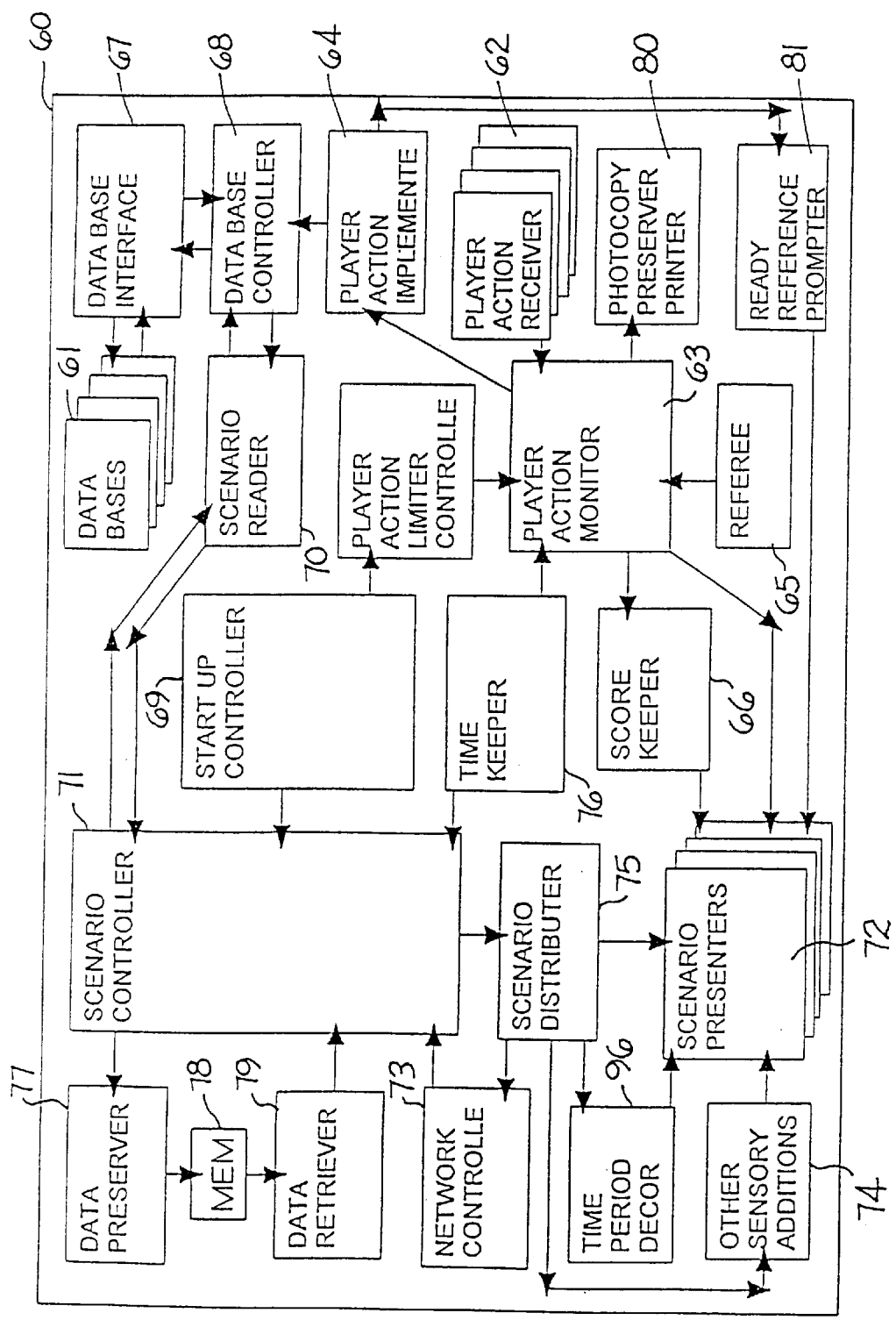
FIG. 3 is a block system data flow diagram illustrating the presentation of historical events permitting the interactive intervention of role players to hypothetically influence the outcome of the historical events in an operation mode embodied in this invention.

As may be seen by reference to FIG. 3, the flow and general sequencing of data involved in presentation of a historical scenario with intervention of interactive role players is diagrammed. This illustrative data flow system encompasses a range of different embodiments ranging from a simple PC station for a single role player to a complex system of multiple role players in an auditorium, theme park or different locations. The role players each have access to appropriate reenactment display facilities as simple as a computer screen or more complex arcade type interactive facilities with accompanying instrumentation.

Also the role intervention can range from the simplicity of a single role player introduced interactively near the end of the scenario with the opportunity to influence the outcome by personal input by way of a restricted menu featuring defined sets of circumstances, to more complex situations. Thus, a variety of role playing facilities and circumstances may be adopted either for single or multiple interacting role players. For example, the role players may have custom made work stations relating to the roles with such instrumentation as a musket to fire, a horse to ride or an airplane to control. The reenactment may be a simple video story format with preconceived action inserts or it may involve the multi-media arts with the ability of a role player to audio-visually take command of a meeting in-situ in the historical event.

The present state of the computer arts will permit those skilled in the art to program the various computer functions and the interaction of the role players with a scenario script to achieve the corresponding data flow relationships referenced in FIG. 3.

The general procedure for reenacting an authentic historical event scenario on a computer system for viewing by interactive participants is exemplified, wherein roles in the historical event may be segregated for role player interactivity. The start up controller 69 initiates a scenario reenactment depending upon the necessary conditions of readiness of presentation stages and screens, the family of role players, scheduled performances, etc. Then the data flow processes the player input interactivity and conforms the scenario in accordance therewith to present in one embodiment a hypothetical synthesized version of the authentic scenario reflecting the impact of the role player interactivity. In order to reinforce the understanding of the role player of the role and the impact on history of the historic role player, then a report is prepared for feedback to the role player for (a) "scoring" as an exam grade or proficiency rating, (b) reinforcing the role players understanding of the historical event and the impact of that role, and (c) involving the player personally into the action to incite better interest and attention to the details of the scenario. Thus, history can even present a learning challenge where students can compete with each other for grades, understanding and later recall from personal memory of both the historical facts and the impact upon history.

In more detail, starting with the data bases 61, an available historic scenario, such as hereinbefore exemplified, is either presented according to a given schedule, such as at a theme park, or is selected for personal presentation by player action 62 at a suitable role player station by either a single player or team of players. The player interactivity thus provided is monitored at the monitor block 63 and implemented at implementation block 64 under control of the referee block 65 to keep the players within designated action bounds and realistic in their inputs. For example introduction of a telephone, an automobile or aircraft would be inappropriate in the revolutionary period about 1776.

Score is kept at block 66 in a suitable manner such as if grading a test or on the basis of proficiency in making decisions under the environmental conditions encountered. The players will be given the option to choose more elementary or more advanced roles so that they can realistically interact depending upon their background (high school-elementary school-adult, etc), and the referee section 65 may be given a pre-qualification background summary of the role player to monitor.

Thus, by initiation of the players input action (62), the monitor processes implementation via block 64 to interface with the data base interface 67 via controller 68 for introducing into the scenario reader section 70 appropriate menus, rules and review data including hypothetical synthesized endings for reenactment of the scenario in response to player role input. The scenario controller section 71 processes and distributes the forwarded data for controlling the presentation of the scenario at various stations 72, and to remotely located role players via network controls 73.

Some other sensory additions may be introduced at 74 by action of the scenario distributer 75 such as weather conditions. To aid the referee 65, the time period decor section 96 monitors any interactive input relating to decor such as costumes and stage props which may be introduced in multi-media embodiments for example, to assure that the decor complies historically with the scenario being reenacted.

The time keeper 76 is a system clocking system that provides for sequencing scenes and synchronizing action throughout the reenactmentation and particularly for controlling the implementation of player actions that modify the presentation of the scenarios.

The role player data is preserved at 77 for storage at 78 to be retrieved at 79 for reports, scoring and retention if necessary. Thus, photocopy records may be preserved and printed at section 80.

The ready reference prompter section 81 coordinates player input action when ready to implement at 64 with the scenarios being presented at 72.

Figure 4:
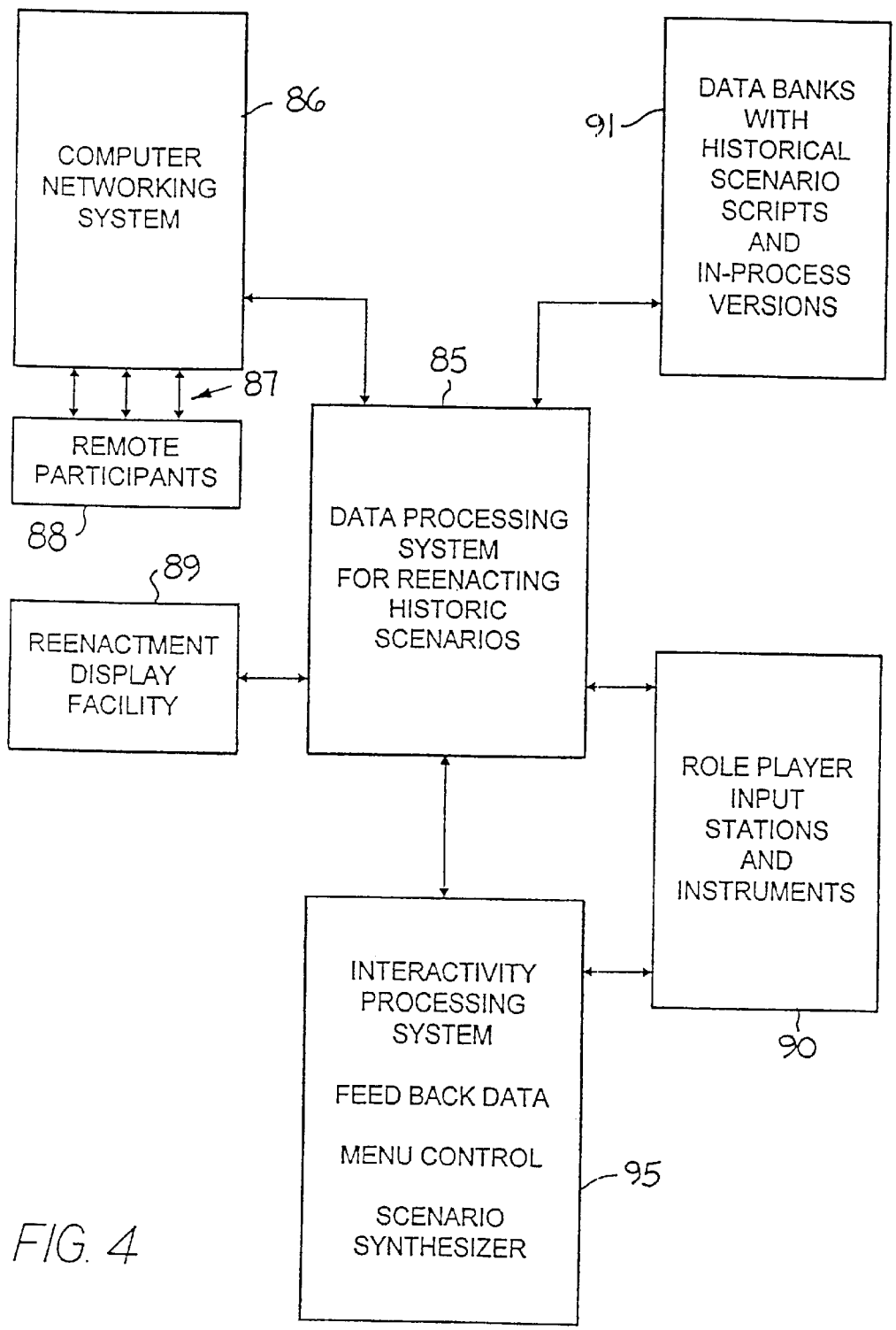
FIG. 4 is a block diagram of a computerized data processing system embodying the invention.

This data flow is implemented in a data processing system as set forth in block diagram format in FIG. 4. The logic and control of the reenactment of the scenarios is manipulated by the central data processing system 85. This system works with a computer networking system 86 for linking (87) the system with remote participant stations 88, which may include a portion of the reenactment display facilities 89 (as previously discussed with reference to FIG. 1), and player input station facilities 90.

A data bank library 91 supplies scenario scripts as available and may store in-process script modifications, menus for player roles, etc. to the extent that they are not incorporated into the data processing system 85 and the interactivity processing section 95. This section 95 can be characterized as a scenario synthesizer that reorganizes the scenario to incorporate the role player's input actions and decisions. All of these units involve state of the art computer systems programmed to process data flow in the manner set forth in FIG. 3 for implementing the various control functions set forth in FIG. 2.

In summary, this invention provides a computer controlled interactive historical event reenactment system with an electronic computer data base 91 and operating system including the data processing system 85 programmed for reenacting and displaying (89) a historical event. The operating system includes role player input stations and instruments 90 for providing and organizing, in conjunction with the data processing system 85 and interactivity processing system 95, at least one player participation role with a limited range of interactivity thereby serving to modify the reenactment of the computer controlled historical events. The interactivity processing system organizes interactive control permitting the role player to intervene on-line in a reenacted historical event to introduce a substituted historical event permitting personal input within a programmed range of allowed actions, thus serving the affect the outcome of the historical event.

The system, by way of interactivity processing system 95, formulates with the data processing system 85 a computer analysis and synthesis subroutine for developing from the interactive participation of the intervening role player a modified outcome of the historical event.

The computer networking system 86 of the electronic computer operated system communicates electronically over a network, with role playing stations 90 and remote participants 88 in different role playing sites, for integration of interactively introduced roles at a plurality of the playing stations into the data processing system 85. This incorporates into the historical event being reenacted by the computer controlled historical event reenactment system the hypothetical synthesized historical event reenactment influenced by the participating role player's input provided in accordance with this invention.

It is thus recognized that this invention has introduced novel methods and apparatus for reenacting historical scenarios with role player intervention in a meaningful way that incites student interest and reinforces understanding and memory of the relevant roles and scenes and their impact upon history. Accordingly, those features of novelty relating to the spirit and nature of the invention are set forth with particularity in the appended claims.

What is claimed is:

1. A computer controlled interactive historical event re-enactment system, comprising in combination:

an electronic computer data base and operating system including a data processing system programmed for reenacting and displaying a scenario constituting a historical event, said operating system including means for providing and organizing at least one historical role for interactive intervention by at least one player within a limited range of interactivity in the reenacting of said historical event that has potential to chance historical outcome of the historical event dependent on the intervention by the at least one player, interactive control means permitting said at least one player to intervene and participate in said at least one historical role reenacted in the historical event scenario including providing personal input within said limited range of interactivity serving thereby to provide a conclusion to the historical event reflecting the intervention in the at least one historical role participated in by said at least one player, and interactivity processing means for formulating with said operating system a computer analysis and synthesis subroutine for developing from the intervention by said at least one player within said limited range of interactivity in said historical event scenario a synthesized outcome of the historical event to modify following scenario portions to reflect consequences of the intervention upon the historical event from said participation in the at least one historical role by said at least one player, so as to provide historical education.

2. The system defined by claim 1, wherein the electronic computer data base and operating system further comprises means for communicating electronically over a network with role playing stations in different playing sites, and wherein the interactivity processing means further comprises means for integrating interactively introduced roles at a plurality of said playing stations into the synthesized outcome of the historical event.

3. The system defined in claim 2 wherein the playing sites comprise interactive input means for said at least one player simulating artifacts consistent with the historical event scenario.

4. The system defined in claim 2 wherein the interactive control means comprise a joystick for controlling movements of an object involved in the reenacting of the scenario of the historical event.

5. The system defined by claim 1, wherein the electronic computer data base and operating system comprises a personal computer provided with interactive input means for said at least one player.

6. The system defined by claim 1 further comprising a display screen for viewing the historical event by the at least one player, and means for presenting interactive menus on the screen for different players, each menu limiting interactivity within a predetermined degree of participation in the historical event to affect outcome of the historical event.

7. The system defined by claim 1 wherein the system further comprises a playing gallery site for competitive role playing between at least two players, and wherein the electronic computer data base and operating system is programmed to monitor and compare performance of the at least two players.

8. The system defined in claim 1 wherein said electronic computer data base and operating system further comprises a set of scenario scripts for different historic events stored in a memory system, and corresponding script selection means for permitting said at least one player to select a role to be played in a stored scenario script to be reenacted.

9. The system defined by claim 1 wherein the interactive control means further comprises an instrumented theme park facility presenting the historical event being reenacted.

10. The system defined by claim 1 wherein the interactive control means further comprises an auditorium with intervention station means permitting team participation for implementing said at least one historical role by said at least one player.

11. The system of claim 1 further comprising control means for permitting said at least one player to participate at a selected skill level.

12. A method of reenacting historical scenarios, comprising steps of:

reenacting a scenario constituting a predetermined historical event with a computer system for viewing by an audience of at least one viewer, segregating at least one key role in the historical event which will affect historical outcome of the event, providing in the computer system interactivity processing means for permitting at least one participating role player to select and enter into an ongoing scenario interactive intervention having potential to change the historical outcome of the historical event, and formulating by said computer system and incorporating into the scenario as the scenario is being reenacted a synthesized hypothetical outcome for the historical event being reenacted reflecting entry of the interactive intervention by the at least one participating role player, so as to provide historical education.

13. The method of claim 12 further comprising:

providing a programmed computer report for the at least one participating role player comparing the performance of the at least one participating role player with a corresponding role of each of said at least one player of the pre-determined historical event.

14. The method of claim 12 further comprising steps of:

producing the scenario as an authentic historic scenario, segregating in the authentic historic scenario scenario roles to be played by the at least one participating role player, interactively modifying the authentic historic scenario by interactive participation of the at least one participating role player in one of the scenario roles, and providing the at least one participating role player with an analysis of the interactive participation impact on the authentic historic scenario.

15. The method of claim 14 further comprising the steps of:

synthesizing the scenario roles in a format represented in menu choices presented interactively to the at least one participating role player for selecting a role, and storing feedback to the at least one participating role player following participation synthesized scenario analyses conforming to the role selected by the at least one participating role player.

16. A computer controlled interactive historical event re-enactment system, comprising in combination:

a data processing system programmed for reenacting historic scenarios, a role player data input station for intervening a role player interactively into presentation of a historic scenario for said role player to act in a limited role in a portion of the historic scenario to potentially effect outcome of the historical event based on intervention of said role player, interactive processing means programmed in said data processing system for synthesizing a hypothetical historic scenario outcome to a scenario being reenacted responsive to the intervention of said role player, and feedback means for comparatively teaching the role player consequences of the intervention by the role player in outcome of the historical event.

* * * * *

UNITED STATES PATENT AND TRADEMARK OFFICE
CERTIFICATE OF CORRECTION

PATENT NO. : 6,164,971
DATED : December 26, 2000
INVENTOR(S) : Grayden T. Figart It is certified that error appears in the above-identified patent and that said Letters Patent is hereby corrected as shown below:

Column 7,
Line 6, "enviromental-conditions" should read -- enviromental conditions --.

Column 13, claim 1,
Line 2, "chance" should read -- change --.

Signed and Sealed this

Twenty-third Day of October, 2001

*Attest:*

NICHOLAS P. GODICI
*Attesting Officer*     *Acting Director of the United States Patent and Trademark Office*